(12) United States Patent
Nishiumi et al.

(10) Patent No.: US 7,937,207 B2
(45) Date of Patent: May 3, 2011

(54) EXHAUST GAS PURIFICATION SYSTEM FOR INTERNAL COMBUSTION ENGINE

(75) Inventors: Ryoji Nishiumi, Toyota (JP); Takeshi Hashizume, Mishima (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 506 days.

(21) Appl. No.: 12/096,690

(22) PCT Filed: Dec. 11, 2006

(86) PCT No.: PCT/JP2006/325125
§ 371 (c)(1),
(2), (4) Date: Jun. 9, 2008

(87) PCT Pub. No.: WO2007/066835
PCT Pub. Date: Jun. 14, 2007

(65) Prior Publication Data
US 2009/0165758 A1    Jul. 2, 2009

(30) Foreign Application Priority Data

Dec. 9, 2005    (JP) ................. 2005-356623

(51) Int. Cl.
*G06F 19/00* (2006.01)
*F02M 25/07* (2006.01)
*F02B 47/08* (2006.01)
*F02B 33/44* (2006.01)
*F01N 3/20* (2006.01)

(52) U.S. Cl. ............. 701/108; 60/274; 60/278; 60/286; 60/605.2; 123/568.21

(58) Field of Classification Search ............ 123/568.11, 123/568.12, 568.21; 701/101–103, 108, 701/114; 60/274, 277, 278, 285, 286, 299, 301, 303, 311, 605.2
See application file for complete search history.

(56) References Cited

U.S. PATENT DOCUMENTS

| | | | |
|---|---|---|---|
| 5,775,099 A | 7/1998 | Ito et al. | |
| 5,924,280 A * | 7/1999 | Tarabulski | 60/286 |
| 7,080,506 B2 * | 7/2006 | Fukuzumi et al. | 60/278 |
| 7,284,366 B2 * | 10/2007 | Kurtz | 60/274 |
| 7,353,648 B2 * | 4/2008 | Zhang | 60/278 |
| 2003/0061802 A1 * | 4/2003 | Nakatani et al. | 60/286 |
| 2005/0198945 A1 | 9/2005 | Okugawa et al. | |
| 2006/0266019 A1 * | 11/2006 | Ricart-Ugaz | 60/278 |

(Continued)

FOREIGN PATENT DOCUMENTS

JP    7-332071 A    12/1995

(Continued)

*Primary Examiner* — Willis R Wolfe, Jr.
(74) *Attorney, Agent, or Firm* — Sughrue Mion, PLLC (57) ABSTRACT

An object of the present invention is to provide a technology that enables to enhance the effect of decreasing the NOx emission achieved by an exhaust gas purification system as a whole while favorably achieving both reduction in the amount of NOx generated in an internal combustion engine by means of EGR and reduction reaction of NOx in an NOx catalyst even when a reduction process for the NOx catalyst is performed while EGR is being performed. In the invention, in the case where addition of fuel into an exhaust pipe from a fuel addition valve 28 is performed to carry out the reduction process for the NOx catalyst 20 when EGR is being performed mainly by means of a low pressure EGR passage 23, the amount of the exhaust gas passing through the NOx catalyst 20 is decreased by decreasing the amount of the exhaust gas recirculated by the low pressure EGR passage 23.

9 Claims, 3 Drawing Sheets

U.S. PATENT DOCUMENTS

2007/0186536 A1 * 8/2007 Hashizume .................. 60/278

FOREIGN PATENT DOCUMENTS

| JP | 10-103044 A | 4/1998 |
| --- | --- | --- |
| JP | 11-294145 A | 10/1999 |
| JP | 2002-106333 A | 4/2002 |
| JP | 2002-180885 A | 6/2002 |
| JP | 2002-256931 A | 9/2002 |
| JP | 2003-106136 A | 4/2003 |
| JP | 2004-150319 A | 5/2004 |
| JP | 2004-156572 A | 6/2004 |
| JP | 2005-76456 A | 3/2005 |
| JP | 2005-240758 A | 9/2005 |
| JP | 2005-256804 A | 9/2005 |

* cited by examiner

EXHAUST GAS PURIFICATION SYSTEM FOR INTERNAL COMBUSTION ENGINE

TECHNICAL FIELD

The present invention relates to an exhaust gas purification system for an internal combustion engine equipped with an exhaust gas recirculation apparatus.

BACKGROUND ART

As technologies of reducing the amount of nitrogen oxides (which will be hereinafter referred to as "NOx") emitted to the atmosphere from an internal combustion engine, exhaust gas purification systems equipped with an exhaust gas recirculation apparatus (which will be hereinafter referred to as an "EGR apparatus") or an exhaust gas purification apparatus such as NOx catalyst or a particulate filter (which will be hereinafter referred to as a "filter") on which an NOx catalyst is supported are known.

The NOx catalyst stores NOx in the exhaust gas discharged from an internal combustion engine into it to thereby purify the exhaust gas.

The EGR apparatus is an apparatus that returns a portion of the exhaust gas to the air intake system of the internal combustion engine to reduce the combustion temperature of the air-fuel mixture in the combustion chamber thereby reducing the amount of NOx generated in the internal combustion engine.

Japanese Patent Application Laid-Open No. 2004-150319 discloses an internal combustion engine that has a turbocharger as a supercharger and is equipped with a low pressure EGR apparatus that recirculates a portion of the exhaust gas emitted from an NOx catalyst provided downstream of the turbine of the turbocharger to the intake pipe upstream of the compressor of the turbocharger in addition to a normal EGR apparatus (which will be hereinafter referred to as a "high pressure EGR apparatus") that recirculate a portion of the exhaust gas in the exhaust pipe upstream of the turbine of the turbocharger to the intake pipe downstream of the compressor of the turbocharger.

Furthermore, Japanese Patent Application Laid-Open No. 2005-76456 discloses an internal combustion engine equipped with a high pressure EGR apparatus and a low pressure EGR apparatus in which when low-temperature combustion is performed in the internal combustion engine, the amount of the exhaust gas recirculated by the high pressure EGR apparatus and the amount of the exhaust gas recirculated by the low pressure EGR apparatus are regulated based on the required engine load.

Still further, Japanese Patent Application Laid-Open No. 2004-156572 discloses an EGR apparatus having a high pressure EGR apparatus and a low pressure EGR apparatus in which the amount of the exhaust gas recirculated by the high pressure EGR apparatus and the amount of the exhaust gas recirculated by the low pressure EGR apparatus are varied according to the operation condition of the internal combustion engine.

DISCLOSURE OF THE INVENTION

When EGR is performed using the high pressure EGR apparatus, the amount of the exhaust gas used to drive the turbine will be decreased by the amount of the exhaust gas recirculated to the internal combustion engine by the high pressure EGR apparatus. Accordingly, if a large amount of EGR is performed using the high pressure EGR apparatus, there is a possibility that a sufficient supercharging pressure cannot be achieved.

On the other hand, when EGR is performed using the low pressure EGR apparatus, since a portion of the exhaust gas is recirculated to the internal combustion engine after driving the turbine, the supercharging pressure is hardly decreased even if the amount of the exhaust gas recirculated to the internal combustion engine by the low pressure EGR apparatus is increased. In addition, since the exhaust gas introduced into the intake passage by the low pressure EGR apparatus will be supplied to the internal combustion engine together with fresh air by supercharging by the compressor, a large amount of EGR gas can be introduced into the internal combustion engine.

Therefore, achieving a large amount of EGR using the low pressure EGR apparatus is effective in order to reduce the amount of NOx generated in the internal combustion engine.

In internal combustion engines equipped with an NOx catalyst, a reduction process in which a reducing agent such as fuel (which will be simply referred to as "fuel" hereinafter) is supplied to the NOx catalyst at a time when a certain amount of NOx has been stored in the NOx catalyst to reduce and remove the NOx stored in the NOx catalyst is performed when appropriate, because the NOx storage capacity of the NOx catalyst has a limit.

The method of supplying fuel to the NOx catalyst includes, for example, adding fuel into the exhaust gas in the upstream of the NOx catalyst. In this case, the fuel added into the exhaust gas causes a reduction reaction with the NOx stored in the NOx catalyst while passing through the NOx catalyst with the exhaust gas. This means that the time period during which the NOx reduction reaction proceeds favorably is limited within the time period during which the added fuel passes through the NOx catalyst. For this reason, making the residence time of the fuel in the NOx catalyst long is effective in order to favorably perform the reduction process in the NOx catalyst.

However, at times when a large amount of EGR is performed by the low pressure EGR apparatus in order to reduce the amount of NOx generated in the internal combustion engine, fresh air and EGR gas are supplied to the internal combustion engine by supercharging at a high supercharging pressure by the turbocharger, as described above. Therefore, the flow rate of the exhaust gas discharged from the internal combustion engine becomes higher and the space velocity of the exhaust gas becomes higher. This makes the residence time of the fuel that passes through the NOx catalyst with the exhaust gas in the NOx catalyst shorter, and there is a possibility that the time of reaction of fuel and NOx in the reduction process becomes insufficient. If this is the case, there is a possibility that the NOx stored in the NOx catalyst is not reduced sufficiently.

The present invention has been made in view of the above problem and has as an object to provide a technology of further enhancing the effect of reducing the NOx emission achieved by the gas purification system as a whole, wherein both the reduction of NOx by the EGR and the reduction process in the NOx catalyst are carried out favorably when the EGR and the reduction process in the NOx catalyst are performed at the same time.

An exhaust gas purification system according to the present invention that is intended to achieve the above described object is characterized by comprising an exhaust gas purification apparatus that purifies exhaust gas discharged from the internal combustion engine, a fuel addition apparatus that supplies fuel from upstream of said exhaust gas purification apparatus, a turbocharger including a turbine provided in an exhaust pipe upstream of said exhaust gas purification apparatus and a compressor provided at a point in an intake pipe of said internal combustion engine, a high pressure EGR apparatus that recirculates a portion of exhaust gas in the exhaust pipe upstream of said turbine into the intake pipe downstream of said compressor, a low pressure EGR apparatus that recirculates a portion of exhaust gas in the exhaust pipe downstream of said exhaust gas purification apparatus into the intake pipe upstream of said compressor, and a control unit for controlling the amount of the exhaust gas recirculated by said high pressure EGR apparatus and/or the amount of the exhaust gas recirculated by said low pressure EGR apparatus to control the amount of the exhaust gas passing through said exhaust gas purification apparatus, when fuel is supplied to said exhaust gas purification apparatus from said fuel addition apparatus.

By this configuration, the amount of the exhaust gas passing through the exhaust gas purification apparatus can be controlled by controlling the amount of the exhaust gas recirculated by the high pressure EGR apparatus (which amount will be hereinafter referred to as the "high pressure EGR gas amount") and/or the amount of the exhaust gas recirculated by the low pressure EGR apparatus (which amount will be hereinafter referred to as the "low pressure EGR gas amount").

The high pressure EGR gas amount and the low pressure EGR gas amount that optimize the exhaust gas purification effect achieved by the EGR (which amounts will be hereinafter referred to as the "first set amounts") and the high pressure EGR gas amount and the low pressure EGR gas amount that optimize the exhaust gas purification effect achieved by the exhaust gas purification apparatus (which amounts will be hereinafter referred to as the "second set amounts") may differ from each other in some cases.

According to the present invention, in such cases, the high pressure EGR gas amount and the low pressure EGR gas amount at the time when the exhaust gas purification by the exhaust gas purification apparatus is performed may be controlled to intermediate values between the first set amounts and the second set amounts.

When the high pressure EGR gas amount and the low pressure EGR gas amount are controlled in this way, there is a possibility that the exhaust gas purification effect achieved by the EGR is decreased to an extent. However, the exhaust gas purification by the EGR and the exhaust gas purification by the exhaust gas purification apparatus can both be carried out appropriately by determining the aforementioned intermediate values in such a way that the degree of increase in the exhaust gas purification effect achieved by the exhaust gas purification apparatus becomes larger as compared to the degree of decrease in the exhaust gas purification effect achieved by the EGR.

As a result, it becomes possible to control the amount of the exhaust gas passing through the exhaust gas purification apparatus when the exhaust purification by the exhaust gas purification apparatus is performed, so that the exhaust gas purification effect achieved by the exhaust gas purification system as a whole can be enhanced.

For example, in a case where an NOx catalyst is provided as the exhaust gas purification apparatus, fuel is supplied to the NOx catalyst from the fuel addition apparatus in order to carry out a reduction process of reducing NOx or SOx stored in the NOx catalyst to thereby restore the NOx storage ability of the NOx catalyst.

In the exhaust gas purification system for an internal combustion engine configured as above, in cases where recirculation of the exhaust gas by the low pressure EGR apparatus is performed at the time when the fuel addition in this reduction process is being performed, the low pressure EGR gas amount may be made smaller as compared to when the reduction process is not performed.

By doing so, in the normal time or the time in which the reduction process is not being performed, the amount of NOx generated in the internal combustion engine can be reduced to a large extent by introducing a large amount of EGR gas into the internal combustion engine by means of the low pressure EGR apparatus. In addition, in the time during which the reduction process is being performed, it is possible to prevent the amount of the exhaust gas passing through the NOx catalyst from becoming unduly large, and therefore a sufficient time for reaction of the fuel added into the exhaust gas by fuel addition (which fuel will be hereinafter referred to as the "added fuel") in the NOx catalyst can be ensured to be provided, and the NOx storage ability of the NOx catalyst can be restored satisfactorily.

Consequently, also in the time in which the reduction process is being performed, the NOx emission reduction effect achieved by the exhaust gas purification system as a whole can further be enhanced even if the possibility of a certain degree of deterioration in the effect of the EGR in reducing the amount of NOx generated in the internal combustion engine is taken into account.

Furthermore, since the low pressure EGR gas amount is decreased when the fuel addition is performed, inflowing of unburned components contained in the added fuel into the intake system and the low pressure EGR apparatus can be decreased. This enables to decrease griming and performance deterioration of the low pressure EGR apparatus and the intake system.

The activity of the reduction reaction of the NOx or SOx (which will be hereinafter referred to as the "reduction reaction") in the reduction process depends on the condition of the NOx catalyst. Specifically, the higher the degree to which the NOx catalyst is activated is, the more easily the reduction reaction can proceed.

In view of this, in the exhaust gas purification system according to the present invention, if the temperature of the NOx catalyst at the time when the reduction process is performed is lower than a predetermined temperature, the degree of decrease in the low pressure EGR gas amount may be made smaller as compared to when the temperature of the NOx catalyst is higher than or equal to the predetermined temperature. The predetermined temperature is a temperature of the NOx catalyst at which it can be considered that the NOx catalyst is sufficiently activated, and the predetermined temperature is determined in advance by experiments.

This is because the NOx catalyst is not activated sufficiently when the temperature of the NOx catalyst is low and hence the effect of the NOx reduction reaction is hard to be enhanced even if a sufficient time for reduction reaction of the added fuel in the NOx catalyst is ensured to be provided by decreasing the low pressure EGR gas amount to a large extent.

Therefore, when the temperature of the NOx catalyst is low, to enhance the effect of decreasing the amount of NOx generated in the internal combustion engine by the EGR by making the degree of decrease in the low pressure EGR gas amount smaller is preferable in enabling to enhance the NOx emission reduction effect achieved by the exhaust gas purification system as a whole.

The activity of reduction reaction by the added fuel in the reduction process depends on the amount of NOx that the NOx catalyst can further store at the time when the reduction process is performed (which amount will be hereinafter referred to as the "storage capacity to spare"). Specifically, the larger the storage capacity to spare of the NOx catalyst is, the more easily the reduction reaction by the added fuel tends to proceed.

In view of this, in the exhaust gas purification system according to the present invention, the degree of decrease in the low pressure EGR gas amount may be determined in accordance with the storage capacity to spare of the NOx catalyst at the time when the reduction process is performed. Specifically, the larger the storage capacity to spare of the NOx catalyst is, the smaller the degree of decrease in the low pressure EGR gas amount may be made.

This is because in the case where the storage capacity to spare of the NOx catalyst at the time when the reduction process is performed is large, the reduction process proceeds sufficiently even if the time for the reaction of the added fuel in the NOx catalyst is shortened to some extent and hence the effect of the reduction reaction is hard to be decreased.

Therefore, in the case where storage capacity to spare of the NOx catalyst is large, to enhance the effect of decreasing the amount of NOx generated in the internal combustion engine by the EGR by making the degree of decrease in the low pressure EGR gas amount smaller is preferable in enabling to enhance the NOx emission reduction effect achieved by the exhaust gas purification system as a whole.

Since the change in the EGR gas amount introduced into the internal combustion engine can be made smaller by controlling the degree of decrease in the low pressure EGR gas amount appropriately in accordance with the condition of the NOx catalyst as described above, changes in the torque and changes in the combustion noise can also be reduced. As a result, the effect of improving drivability is also achieved.

As described above, when the EGR is performed by means of the low pressure EGR apparatus, the temperature of the exhaust gas discharged from the internal combustion engine tends to become lower, since the mixture of a large amount of exhaust gas and fresh air is introduced into the internal combustion engine.

On the other hand, when the EGR is performed by means of the high pressure EGR apparatus, the temperature of the exhaust gas discharged from the internal combustion engine tends to become higher, since the amount of the exhaust gas recirculated to the internal combustion engine is smaller as compared to when the EGR is performed by means of the low pressure EGR apparatus.

Thus, in the exhaust gas purification system according to the present invention, it is possible to control the temperature of the exhaust gas passing through the NOx catalyst by regulating the high pressure EGR gas amount and the low pressure EGR gas amount to thereby control the temperature of the NOx catalyst.

For example, in order for the reduction reaction of the added fuel in the reduction process to proceed appropriately, it is necessary that the NOx catalyst is sufficiently activated. For this reason, a catalyst temperature raising process of raising the temperature of the NOx catalyst is generally performed in advance before performing the reduction process.

In view of this, in the exhaust gas purification system according to the present invention, when the catalyst temperature raising process is performed, the high pressure EGR gas amount may be made larger as compared to when the catalyst temperature raising process is not performed.

This makes the temperature of the exhaust gas passing through the NOx catalyst higher, and hence the time required for the catalyst temperature raising process can be made shorter.

As a result, the reduction process can be performed earlier, and the effect of the reduction reaction can further be enhanced.

It is known that the NOx storage reaction of the NOx catalyst proceeds most easily when the temperature of the NOx catalyst is in a specific temperature range.

In view of this, in the exhaust gas purification system according to the present invention, when the reduction process is not being performed, the high pressure EGR gas amount and/or the low pressure EGR gas amount may be controlled in such a way that the temperature of the NOx catalyst falls within this specific temperature range.

This enables to enhance the efficiency of NOx storage of the NOx catalyst, and the exhaust gas can be purified more reliably.

In the case where a PM filter is provided as an exhaust gas purification apparatus in the exhaust gas purification system according to the present invention, fuel is supplied to the PM filter from a fuel addition apparatus when appropriate to perform a filter regeneration process in which particulate matter (which will be hereinafter referred to as "PM") collected on the PM filter is oxidized and removed to thereby restore the PM collecting ability of the PM filter.

If the amount of the exhaust gas passing through the PM filter is small when the filter regeneration process is performed, the added fuel is hard to be diffused all over the PM filter, and there is a possibility that a local portion in which the concentration of the fuel is high is generated in the PM filter to cause an excessive temperature rise or that a long time is required to complete oxidation of the PM deposited on the PM filter.

In view of this, in the case of an exhaust gas purification system provided with a PM filter as an exhaust gas purification apparatus, when the filter regeneration process is performed, the low pressure EGR gas amount may be made larger as compared to when the filter regeneration process is not performed.

This makes the amount of the exhaust gas passing through the PM filter larger when the filter regeneration process is performed, and accordingly the added fuel will be diffused over a large area of the PM filter in a short time. Consequently, the PM deposited on the PM filter can be oxidized and removed efficiently. In addition, since the temperature of the low pressure EGR gas is relatively low, the heat of the oxidation reaction of PM generated in the filter regeneration process will be discharged efficiently, and therefore an excessive temperature rise of the PM filter can be prevented.

The activity of the oxidation reaction of PM in the filter regeneration process depends on the temperature of the PM filter. Specifically, the higher the temperature of the PM filter is, more easily the oxidation reaction of PM tends to proceed. For this reason, a filter temperature raising process of raising the temperature of the PM filter is generally performed in advance before performing the filter regeneration process.

In view of this, in the exhaust gas purification system according to the present invention, when the filter temperature raising process is performed, the high pressure EGR gas amount may be made larger as compared to when the filter temperature raising process is not performed.

This makes the temperature of the exhaust gas passing through the PM filter higher, and hence the time required for the filter temperature raising process can be made shorter. As a result, the regeneration process can be performed earlier, and hence the PM removing effect of the PM filter can further be enhanced.

The exhaust gas purification effect achieved by the exhaust gas purification apparatus in the exhaust gas purification system according to the present invention depends on a nature of the fuel added to the exhaust system of the internal combustion engine by fuel addition.

In view of this, in the exhaust gas purification system according to the present invention, the amount of the exhaust gas passing through the exhaust gas purification apparatus may be controlled based on the nature of the added fuel.

For example, in a case where a fuel that is light and easy to evaporate by its nature is used, the added fuel will evaporate in a short time to change the air-fuel ratio of the exhaust gas to be richer to a large extent. However, since the time over which the air fuel ratio of the exhaust gas is changed to be richer is short, there is a possibility, for example in the reduction process for the NOx catalyst, that a sufficient time for the reduction reaction of the added fuel in the NOx catalyst is not provided and the NOx purification effect is deteriorated.

Thus, in this case, it is preferred that the low pressure EGR gas be made smaller at the time of fuel addition.

This enables to decrease the amount of the exhaust gas passing through the exhaust gas purification apparatus and makes it possible to increase the time over which the air-fuel ratio of the exhaust gas passing through the NOx catalyst is shifted to a richer value upon fuel addition.

On the other hand, in a case where a fuel that is hard to evaporate by its nature is used, there is a possibility that the air-fuel ratio of the exhaust gas is not changed to be richer sufficiently even when the fuel addition is performed. Then, since, for example in the case of the NOx catalyst, the reduction reaction proceeds on condition that the ambient atmosphere is made to be richer above a certain level, there is a possibility that the NOx removing effect is deteriorated.

Thus, in this case, it is preferred that the low pressure EGR gas amount be increased at the time of fuel addition.

This enables to increase the amount of the exhaust gas passing through the exhaust gas purification apparatus and promotes evaporation of the added fuel, whereby it is possible to change the air-fuel ratio of the exhaust gas to be richer more reliably at the time of fuel addition.

THE BEST MODE FOR CARRYING OUT THE INVENTION

In the following, the best mode for carrying out the present invention will be described in detail by way of example.

Embodiment 1

Figure 1:
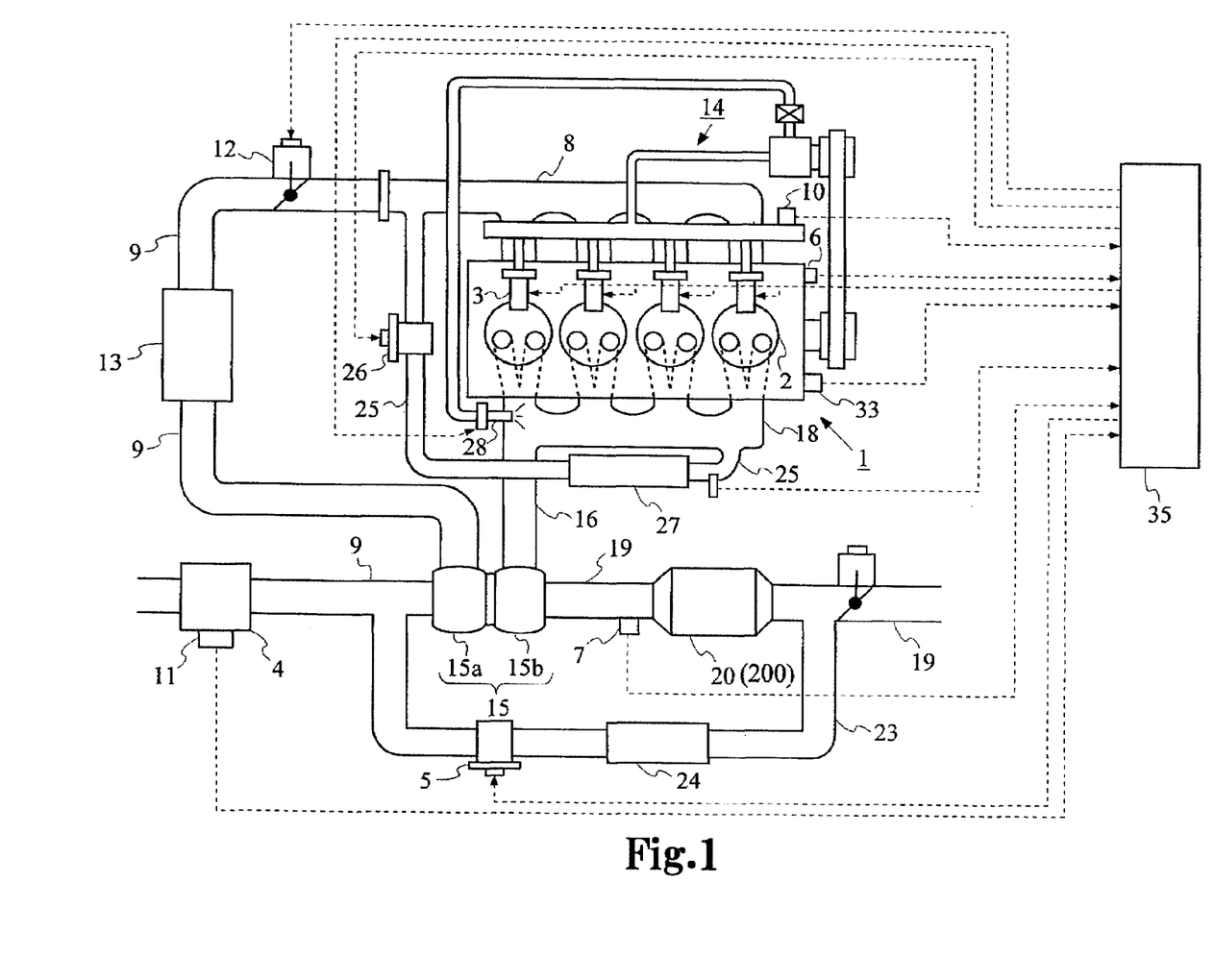
FIG. 1 is a diagram schematically showing the general configuration of an internal combustion engine according to an embodiment of the present invention.

FIG. 1 schematically shows an embodiment of an internal combustion engine to which the present invention is applied. The internal combustion engine 1 shown in FIG. 1 is a diesel engine having four cylinders 2. The internal combustion engine 1 is provided with fuel injection valves 3 that inject fuel directly into the combustion chambers of the respective cylinders 2.

To the internal combustion engine 1 is connected an intake manifold 8, and each branch pipe of the intake manifold 8 is in communication with the combustion chamber of each cylinder 2 through an intake port (not shown). A compressor housing 15a of a turbocharger 15 that operates using the energy of the exhaust gas as the drive source is provided at a point in an intake pipe 9 connected to the intake manifold 8.

An air cleaner 4 is provided upstream of the compressor housing 15a. The air cleaner 4 is provided with an air flow meter 11 that outputs a signal indicative of the quantity of air flowing into the intake pipe 9 to an ECU 35.

An intercooler 13 for cooling intake air flowing in the intake pipe 9 is provided downstream of the compressor housing 15a. A throttle valve 12 that can regulate the intake air quantity is provided downstream of the intercooler 13.

To the internal combustion engine 1 is connected an exhaust manifold 18, and each branch pipe of the exhaust manifold 18 is in communication with the combustion chamber of each cylinder 2 through an exhaust port. The exhaust manifold 18 is connected with a turbine housing 15b of the turbocharger 15 via the joined portion 16 thereof. The turbine housing 15b is connected with an exhaust pipe 19, which leads to the atmosphere in the downstream.

The exhaust manifold 18 is provided with a fuel addition valve 28 having an injection port arranged in such a way as to face into the exhaust manifold 18. The fuel added into the exhaust manifold 18 through the fuel addition valve 28 flows in the exhaust pipe 19 with the exhaust gas to reach an NOx catalyst 20.

The storage reduction type NOx catalyst 20 (which will be hereinafter referred to as the "NOx catalyst") is provided at a point in the exhaust pipe 19.

The NOx catalyst 20 stores NOx in the exhaust gas when the oxygen concentration in the inflowing exhaust gas is high and releases the NOx stored therein when the oxygen concentration in the inflowing exhaust gas is low. In connection with this, if there are reducing components such as fuel in the exhaust gas in the surrounding thereof, reduction reaction of the released NOx and the fuel occurs on the NOx catalyst, whereby NOx is reduced and removed.

The exhaust manifold 18 and the intake manifold 8 are in communication via a high pressure EGR passage 25.

At a point in the high pressure EGR passage 25, there is provided a high pressure EGR valve 26 composed of an electromagnetic valve or the like to change the amount of exhaust gas flowing in the high pressure EGR passage 25 (which amount will be hereinafter referred to as the "high pressure EGR gas amount") responsive to the magnitude of the voltage applied thereto. A high pressure EGR cooler 27 for cooling the high pressure EGR gas is provided upstream of the high pressure EGR valve 26.

When the high pressure EGR valve 26 is opened, the high pressure EGR passage 25 is brought into a state where gas can pass through it, and a portion of the exhaust gas flowing in the exhaust manifold 18 flows into the high pressure EGR passage 25 and recirculates to the intake manifold 8 after passing through the high pressure EGR cooler 27.

The high pressure EGR gas recirculated to the intake manifold 8 is mixed with intake air that flows into the intake manifold 8 through the intake pipe 9 and introduced into the combustion chamber of each cylinder 2.

When the EGR using the high pressure EGR passage 25 is being performed, the amount of the exhaust gas recirculated to the internal combustion engine 1 is relatively small, and accordingly the temperature of the exhaust gas discharged from the internal combustion engine tends to become relatively high.

The exhaust pipe 19 downstream of the NOx catalyst 20 and the intake pipe 9 upstream of the compressor housing 15a is in communication through a low pressure EGR passage 23.

At a point in the low pressure EGR passage 23, there is provided a low pressure EGR valve 5 composed of an electromagnetic valve or the like to change the amount of exhaust gas flowing in the low pressure EGR passage 23 (which amount will be hereinafter referred to as the "low pressure EGR gas amount") responsive to the magnitude of the voltage applied thereto. A low pressure EGR cooler 24 for cooling the low pressure EGR gas is provided upstream of the low pressure EGR valve 5.

When the low pressure EGR valve 5 is opened, the low pressure EGR passage 23 is brought into a state where gas can pass through it, and a portion of the exhaust gas flowing out of the NOx catalyst 20 flows into the low pressure EGR passage 23 and recirculates to the intake pipe 9 upstream of the compressor housing 15a after passing through the low pressure EGR cooler 24.

The low pressure EGR gas recirculated to the intake pipe 9 is mixed with fresh air that flows into the intake pipe 9 through the air cleaner 4, compressed by a compressor provided in the compressor housing 15a and introduced into the combustion chamber of each cylinder 2.

When the EGR is being performed using the low pressure EGR passage 23, a large amount of exhaust gas can be recirculated to the internal combustion engine 1, and accordingly the temperature of the exhaust gas discharged from the internal combustion engine 1 tends to become relatively low.

With recirculation of a portion of the exhaust gas to the internal combustion engine 1 through the high pressure EGR passage 25 and/or the low pressure EGR passage 23, the combustion temperature of the mixture in the combustion chambers of the internal combustion engine 1 becomes lower, and the amount of NOx generated in the combustion process is reduced.

The internal combustion engine 1 is provided with a crank position sensor 33 that outputs an electrical signal indicative of the rotational position of the crankshaft and a water temperature sensor 6 that outputs an electrical signal indicative of the temperature of the cooling water. The exhaust pipe 19 is provided with an exhaust gas temperature sensor 7 that detects the temperature of the exhaust gas flowing in the exhaust pipe 19. A fuel supply apparatus 14 that supplies fuel to the fuel addition valve 28 and the fuel injection valves 3 is provided with a fuel sensor 10 that detects natures such as evaporativity of the fuel.

Each of these sensors is connected with the ECU 35 so that the output signal thereof is input to the ECU 35.

Each of the high pressure EGR valve 26, the low pressure EGR valve 5, the fuel addition valve 28, the fuel injection valves 3 and the throttle valve 12 is electrically connected with the ECU 35 and controlled by a control signal output from the ECU 35.

The ECU 35 controls the operation of the internal combustion engine 1 based on signals input from the respective sensors and controls also the flow rate of the exhaust gas passing though the NOx catalyst 20 (which will be hereinafter referred to as the "catalyst pass-through exhaust gas amount").

Since the amount of the NOx that can be stored in the NOx catalyst 20 has an upper limit, in this embodiment NOx stored in the NOx catalyst 20 is caused to be released appropriately, at a time when a certain amount of NOx has been stored in the NOx catalyst 20, by adding fuel into the exhaust gas through the fuel addition valve 28 (which will be hereinafter referred to as "fuel addition") to change the ambient atmosphere of the NOx catalyst 20 into a reducing atmosphere. At this time, the fuel added by the fuel addition (which will be hereinafter referred to as "added fuel") reaches the NOx catalyst 20 with the exhaust gas and reduces the NOx released from the NOx catalyst 20, whereby the NOx is removed (the above described process will be referred to as the "reduction process").

In the reduction process, since the NOx reduction reaction proceeds while the added fuel passes through the NOx catalyst 20 with the exhaust gas, the time period during which NOx is released from the NOx catalyst 20, reduced and removed efficiently is limited within the time period during which the added fuel is passing through the NOx catalyst 20. Therefore, in order to remove NOx efficiently by the NOx catalyst 20, it is preferred to decrease the catalyst pass-through exhaust gas amount to thereby provide a sufficient time for reaction of the added fuel in the NOx catalyst 20.

On the other hand, the larger the EGR gas amount is, more effectively the amount of NOx generated in the internal combustion engine 1 is reduced. For this reason, to enhance the effect of reducing the amount of NOx generated in the internal combustion engine achieved by the EGR, it is advantageous to perform a large amount of EGR using the low pressure EGR passage 23.

However, when a large amount of EGR is performed using the low pressure EGR passage 23, the catalyst pass-through exhaust gas amount is also becomes large, and hence there is a possibility that the NOx reduction reaction in the NOx catalyst 20 does not proceed appropriately.

As per the above, since the high pressure EGR gas amount and the low pressure EGR gas amount to maximize the effect of reducing the amount of NOx generated in the internal combustion engine 1 achieved by the EGR (these EGR gas amounts will be hereinafter referred to as the "first set amounts") and the high pressure EGR gas amount and the low pressure EGR gas amount to maximize the effect of the NOx reduction reaction in the NOx catalyst 20 (these EGR gas amounts will be hereinafter referred to as the "second set amounts") are different from each other, there has been a possibility that the reduction process for the NOx catalyst 20 is not performed appropriately.

On the other hand, in this embodiment when the reduction process is performed, the low pressure EGR gas amount is reduced concurrently with fuel addition thereby reducing the catalyst pass-through exhaust gas amount.

This ensures to provide a sufficient time for reaction of the added fuel in the NOx catalyst 20, whereby the NOx removing effect of the NOx catalyst 20 can be enhanced.

In this case, since the low pressure EGR gas amount is decreased, there is a possibility that the effect of reducing the amount of NOx generated in the internal combustion engine 1 achieved by the EGR decreases to some degree. However, it is possible to enhance the NOx emission reducing effect achieved by the exhaust gas purification system as a whole by setting the degree of reduction in the low pressure EGR gas amount so that the degree to which the effect of reduction reaction in the NOx catalyst 20 is increased becomes larger than the degree of decrease in the NOx generation amount reducing effect.

Furthermore, since the low pressure EGR gas amount is decreased at the time when the fuel addition is performed, the amount of unburned components contained in the added fuel flowing into the low pressure EGR passage 23 is decreased. This makes it possible to prevent the unburned fuel from flowing into equipments such as the low pressure EGR cooler 24, the low pressure EGR valve 5, the intake pipe 9, the turbo charger 15 and the intercooler 13 to cause griming or deterioration of performance.

Figure 2:
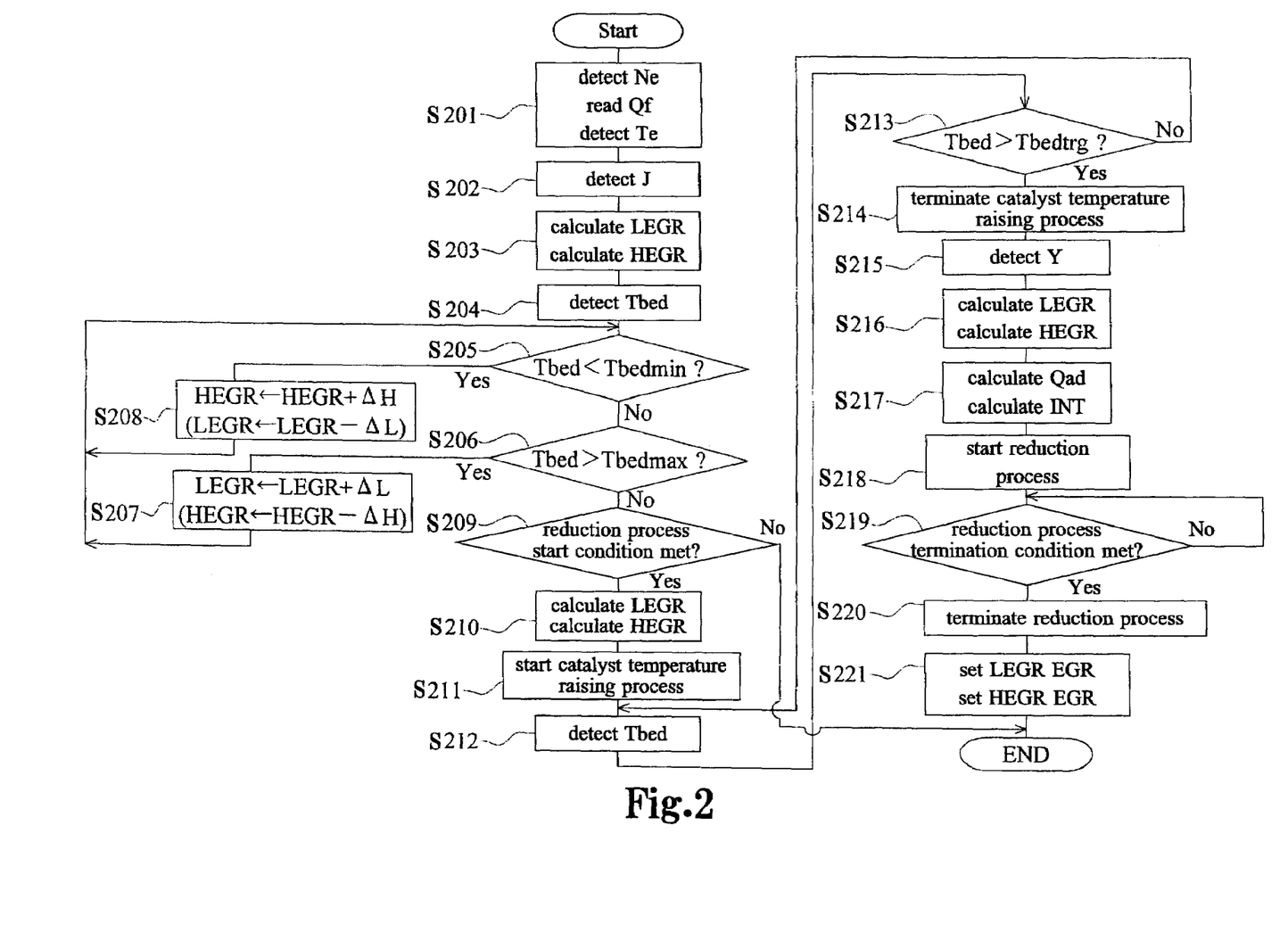
FIG. 2 is a flow chart of a routine of controlling the amount of the exhaust gas passing through an NOx catalyst in the embodiment of the present invention.

In the following, control of the catalyst pass-through exhaust gas amount performed by the ECU 35 will be described with reference to FIG. 2. FIG. 2 is a flow chart of a routine for performing the control of the catalyst pass-through exhaust gas amount. This routine is executed repeatedly by the ECU 35 at predetermined intervals.

First in step 201, the ECU 35 detects the operation state of the internal combustion engine 1. Specifically, the ECU 35 detects the engine speed Ne of the internal combustion engine 1 by means of the crank position sensor 33, detects the water temperature Te by means of the water temperature sensor 6 and calculates the fuel injection quantity Qf based on a control signal for the fuel injection valve 3 supplied by the ECU 35.

In step 202, the ECU 35 detects a nature of the added fuel. Specifically, the ECU 35 detects the evaporativity J of the fuel by means of the fuel sensor 10. The evaporativity J of the fuel is a parameter indicative of the degree of ease of evaporation of the fuel added through the fuel addition valve 28 in the exhaust gas. The lighter the fuel is, the higher that evaporativity J is.

Subsequently, in steps 203 to 209, the ECU 35 sets the low pressure EGR gas amount and the high pressure EGR gas amount in such a way to optimize the effect of reducing the NOx emission achieved by the exhaust gas purification system as a whole at the time when the reduction process is not being performed.

Specifically, first in step S203, the ECU 35 calculates the first set amounts for the low pressure EGR gas amount LEGR and the high pressure EGR gas amount HEGR in accordance with the operation state of the internal combustion engine 1 and the evaporativity J of the fuel. Then, the ECU 35 controls the degree of opening of the low pressure EGR valve 5 and the high pressure EGR valve 26 using the calculated values as control target values for the low pressure EGR gas amount LEGR and the high pressure EGR gas amount HEGR.

Subsequently, in steps 204 to 207, the ECU 35 controls the low pressure EGR gas amount LEGR and the high pressure EGR gas amount HEGR in such a way that the catalyst bed temperature Tbed of the NOx catalyst 20 falls within a predetermined temperature range. In this connection, the predetermined temperature range is a range of the catalyst bed temperature in which the NOx storage efficiency of the NOx catalyst 20 is high, and the predetermined temperature range is determined in advance by experiments.

First in step 204, the ECU 35 detects the catalyst bed temperature Tbed of the NOx catalyst 20. The catalyst bed temperature Tbed may be measured directly by a temperature sensor attached to the NOx catalyst 20 or the exhaust gas temperature detected by the exhaust gas temperature sensor 7 may be substituted for it.

In step 205, the ECU 35 determines whether the catalyst bed temperature Tbed of the NOx catalyst 20 detected in said step 204 is lower than the lower limit value Tbedmin of the above mentioned predetermined temperature range or not.

If the determination in step 205 is affirmative (Tbed<Tbedmin), the ECU 35 proceeds to step 208, where it increases the high pressure EGR gas amount HEGR so as to raise the catalyst bed temperature Tbed of the NOx catalyst 20 (HEGR←HEGR+ΔH1). After execution of step 208, the ECU returns to step 204. At this time, the low pressure EGR gas amount LEGR may be decreased (LEGR←LEGR−ΔL1).

On the other hand, if the determination in step 205 is negative (Tbed≧Tbedmin), the ECU 35 proceeds to step 206, where it determines whether the catalyst bed temperature Tbed of the NOx catalyst 20 is higher than the upper limit value Tbedmax of the above mentioned predetermined temperature range or not.

If the determination in step 206 is affirmative (Tbed>Tbedmax), the ECU 35 proceeds to step 207, where it increases the low pressure EGR gas amount so as to lower the catalyst bed temperature Tbed of the NOx catalyst 20 (LEGR←LEGR+ΔL2). After execution of step 207, the ECU 35 returns to step 204. At this time, the high pressure EGR gas amount HEGR may be decreased (HEGR←HEGR−ΔH2).

Since the EGR using the low pressure EGR passage 23 and the EGR using the high pressure EGR passage 25 have different effects on the temperature of the exhaust gas discharged from the internal combustion engine 1, the temperature of the exhaust gas passing through the NOx catalyst 20 can be controlled by controlling the low pressure EGR gas amount LEGR and the high pressure EGR gas amount HEGR. This enables to control the temperature of the NOx catalyst 20.

If the determination in the aforementioned step 206 is negative (Tbed≦Tbedmax), the ECU 35 proceeds to step 209 with a determination that the catalyst bed temperature of the NOx catalyst 20 falls within the temperature range in which the NOx storing efficiency is high.

In step S209, the ECU 35 determines whether a condition that requires execution of the reduction process for the NOx catalyst 20 is met or not.

Specifically, the ECU 35 determines whether or not the amount of NOx stored in the NOx catalyst 20 exceeds a predetermined stored amount. The predetermined stored amount is determined based on the upper limit value of stored NOx amounts with which the NOx catalyst 20 can exhibit an appropriate NOx storage ability.

If the determination in step 209 is affirmative, the ECU 35 proceeds to execution of the reduction process from step 210 onward with a determination that it is necessary to perform the reduction process for the NOx catalyst 20 to reduce the NOx stored therein.

On the other hand, if the determination in step 209 is negative, the ECU 35 terminates the execution of this routine.

In steps 210 to 213, the ECU 35 executes a catalyst temperature raising process for the NOx catalyst 20.

First in step 210, the ECU 35 calculates a low pressure EGR gas amount LEGR and a high pressure EGR gas amount HEGR that cause an increase in the temperature of the exhaust gas passing through the NOx catalyst 20 according to the operation state of the internal combustion engine 1 and the evaporativity J of the fuel. Then, the ECU 35 controls the degree of opening of the low pressure EGR valve 5 and the high pressure EGR valve 26 using the calculated values as control target values for the low pressure EGR gas amount and the high pressure EGR gas amount.

Examples of such setting of the low pressure EGR gas amount and high pressure EGR gas amount include a setting in which the high pressure EGR gas amount HEGR is increased.

This enables to raise the temperature of the exhaust gas passing through the NOx catalyst 20, and hence the time taken by the catalyst temperature raising process can be shortened.

Next in step 211, the ECU 35 executes the catalyst temperature raising process. Examples of the catalyst temperature raising process include a method of performing post injection in the internal combustion engine 1 and a method of adding a reducing agent to a catalyst having an oxidizing ability provided upstream of the NOx catalyst 20 to raise the temperature of the exhaust gas flowing into the NOx catalyst 20 making use of the reaction heat generated in the oxidation reaction of the reducing agent.

In step 212, the ECU 35 detects the catalyst bed temperature Tbed of the NOx catalyst 20. In the subsequent step 213, the ECU 35 determines whether the detected value Tbed of the catalyst bed temperature is higher than a target temperature Tbedtrg or not. In other words, the ECU 35 determines whether the NOx catalyst 20 has been sufficiently activated or not.

This is because the reduction reaction in the reduction process for the NOx catalyst 20 is hard to proceed in conditions in which the NOx catalyst 20 is not sufficiently activated. The target temperature Tbedtrg is a temperature of the NOx catalyst at which it may be determined that the NOx catalyst 20 has been sufficiently activated to a condition in which the reduction process for the NOx catalyst 20 can be appropriately performed. The target temperature Tbedtrg is determined in advance by experiments.

If the determination in step 213 is negative, the ECU 35 returns to step 212. The ECU 35 executes steps 212 and 213 repeatedly until an affirmative determination is made in step 213.

If determination in step 213 is affirmative, the ECU 35 proceeds to step 214 with a determination that the NOx catalyst 20 has been sufficiently activated, and terminates the catalyst temperature raising process.

In steps 215 to 217, the ECU 35 executes the reduction process. First in step 215, the ECU 35 calculates the storage capacity to spare Y of the NOx catalyst 20. The storage capacity to spare Y is the amount of NOx that the NOx catalyst in the current state can further store without losing its NOx storage ability. Specifically, the storage capacity to spare Y is calculated as the difference between the maximum storage capacity of the NOx catalyst 20 at the current catalyst bed temperature and the amount of NOx currently stored in the NOx catalyst 20.

Here, the maximum storage capacity of the NOx catalyst 20 is the maximum value of the NOx amount that the NOx catalyst 20 can store without losing the NOx storage ability. The maximum storage capacity of the NOx catalyst 20 is determined by the catalyst bed temperature, and it is determined in advance by experiments.

In step 216, the ECU 35 calculates a low pressure EGR gas amount LEGR and a high pressure EGR gas amount HEGR that make the NOx emission reducing effect achieved by the exhaust gas purification system as a whole as high as possible according to the operation state of the internal combustion engine 1, the evaporativity J of the fuel and the storage capacity to spare Y of the NOx catalyst 20. Then, the ECU 35 controls the degree of opening of the low pressure EGR valve 5 and the high pressure EGR valve 26 using the calculated values as control target values for the low pressure EGR gas amount LEGR and the high pressure EGR gas amount HEGR.

Examples of such setting of the low pressure EGR gas amount and high pressure EGR gas amount include a setting in which the low pressure EGR gas amount LEGR is decreased.

This enables to decrease the catalyst pass-through exhaust gas amount, and hence a sufficient time for reduction reaction of the added fuel in the NOx catalyst 20 can be ensured to be provided.

In cases where a fuel having high evaporativity J is used as the added fuel, the added fuel evaporates in a short time to change the air-fuel ratio of the exhaust gas to be richer to a large extent, but the time over which the air fuel ratio of the exhaust gas is changed to be richer is short. There is a possibility that a time sufficient for reduction reaction of the added fuel in the NOx catalyst 20 is not provided.

In view of this, the higher the evaporativity J of the added fuel is, the larger the degree of decrease in the low pressure EGR gas amount may be made.

This causes a decrease in the catalyst pass-through exhaust gas amount, and hence a reaction time of the added fuel in the NOx catalyst 20 can be ensured to be provided more reliably.

When the storage capacity to spare Y of the NOx catalyst 20 is large, the reduction reaction of the added fuel in the NOx catalyst 20 tends to proceed easily. In this case, accordingly, the effect of the reduction reaction is hard to be decreased even if the reaction time of the added fuel in the NOx catalyst 20 is shortened to some extent.

In view of this, the larger the storage capacity to spare Y is, the smaller the degree of decrease in the low pressure EGR gas amount may be made.

This makes the change in the EGR gas amount with a decrease in the low pressure EGR gas amount smaller, and therefore changes in the torque and changes in the combustion noise can be reduced. As a result, advantageous improvement in the drivability can also be achieved.

By the above described steps 215 and 216, the low pressure EGR gas amount and the high pressure EGR gas amount are controlled to be made closer to the second set amounts from the first set amounts. This may possibly decrease the effect of reducing the amount of NOx generated in the internal combustion engine 1 to some extent. However, the effect of reducing the NOx emission achieved by the exhaust gas purification system as a whole can be enhanced by determining the degree of decrease in the low pressure EGR gas amount in such a way that the degree of improvement in the effect of the reduction reaction becomes larger than the degree of the aforementioned decrease of the effect of reducing the amount of NOx generated in the internal combustion engine 1.

Next in step 217, the ECU 35 calculates a fuel addition quantity Qad through the fuel addition valve 28 and a fuel addition interval INT in accordance with the evaporativity J of the fuel.

In step 218, the ECU 35 controls the fuel addition valve 28 based on the fuel addition quantity Qad and the fuel addition interval INT calculated in step 217 to perform fuel addition, thereby starting the reduction process for the NOx catalyst 20.

In step 219, the ECU 35 determines whether a condition for terminating the reduction process is met or not. The way of determining the condition for terminating the reduction process may be exemplified by determining whether or not the storage capacity to spare of the NOx catalyst 20 has exceeded a predetermined amount after a certain amount of NOx has been discharged from the NOx catalyst 20 by the reduction process. The ECU 35 executes step S218 repeatedly until an affirmative determination is made, and if an affirmative determination is made, the ECU 35 proceeds to step 220, where it terminates the reduction process. Specifically, the ECU 35 controls the fuel addition valve 28 to stop the fuel addition.

Next in step 221, the ECU 35 changes the low pressure EGR gas amount LEGR and the high pressure EGR gas amount HEGR back to the first set amounts and terminates the execution of this routine.

Figure 3:
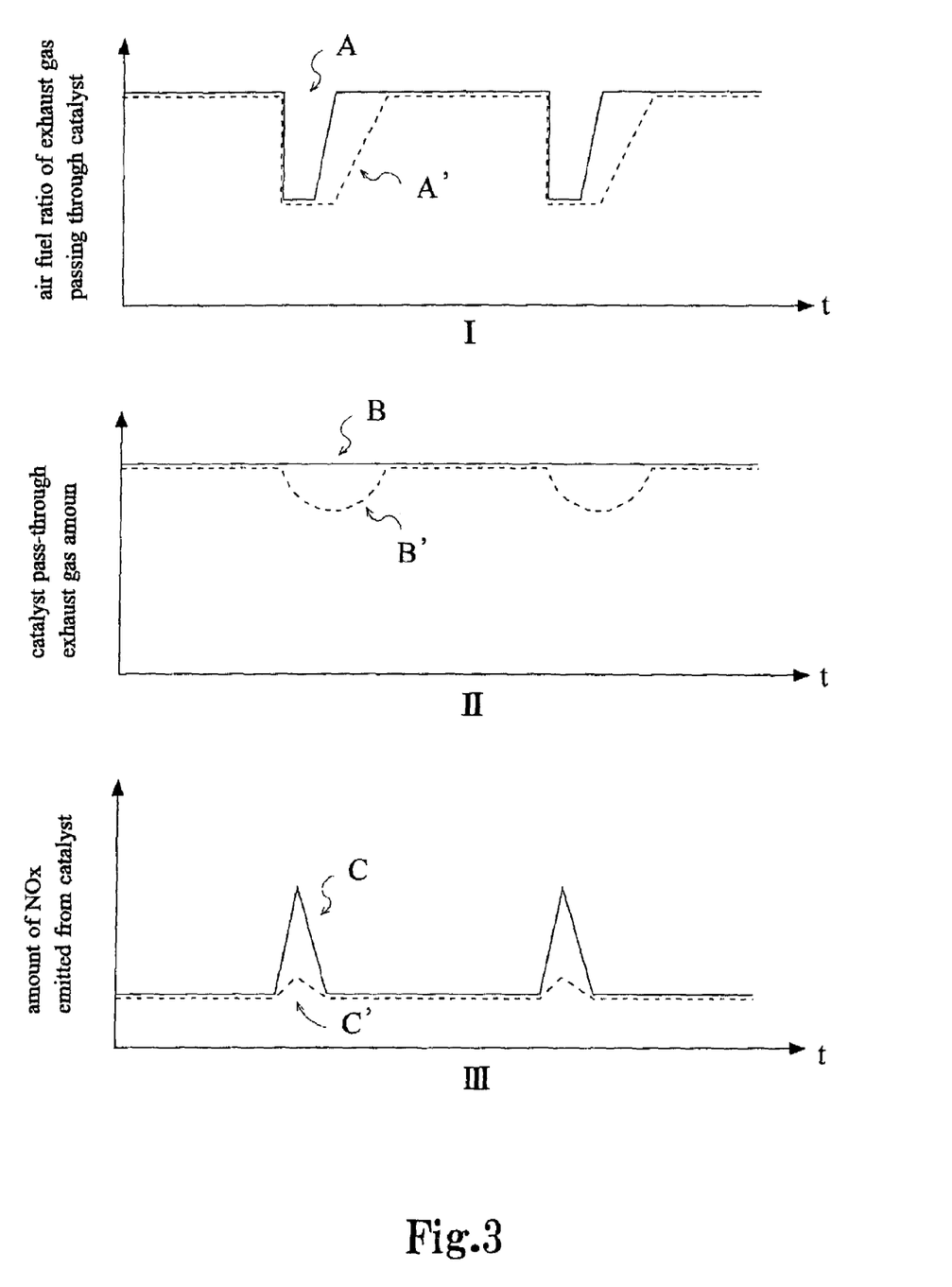
FIG. 3 shows changes in the air-fuel ratio of the exhaust gas passing through the NOx catalyst, the amount of the exhaust gas passing through the NOx catalyst and the amount of the NOx emitted from the NOx catalyst with time when a control of the amount of the exhaust gas passing through the NOx catalyst is performed in the embodiment of the present invention.

FIG. 3 includes graphs showing changes in the air-fuel ratio of the exhaust gas passing through the NOx catalyst 20, the catalyst pass-through exhaust gas amount and the amount of NOx emitted from the NOx catalyst 20 with time when the above described routine of controlling the catalyst pass-through exhaust gas amount is executed by the ECU 35.

In FIG. 3(I), the horizontal axis represents time, and the vertical axis represents the air-fuel ratio of the exhaust gas passing through the NOx catalyst. In FIG. 3(II), the horizontal axis represents time, and the vertical axis represents the catalyst pass-through exhaust gas amount. In FIG. 3(III), the horizontal axis represents time, and the vertical axis represents the amount of NOx emitted from the NOx catalyst 20. In FIGS. 3(I) to (III), the curves drawn in solid lines indicate changes in the air-fuel ratio of the exhaust gas passing through the NOx catalyst 20, the catalyst pass-through exhaust gas amount and the amount of NOx emitted from the NOx catalyst with time in the case where the control of the catalyst pass-through exhaust gas amount according to this embodiment is not performed, and the curves drawn in broken lines indicate changes in the air-fuel ratio of the exhaust gas passing through the NOx catalyst 20, the catalyst pass-through exhaust gas amount and the amount of NOx emitted from the NOx catalyst with time in the case where the control of the catalyst pass-through exhaust gas amount according to this embodiment is performed.

When fuel addition is carried out by the fuel addition valve 28 so as to perform the reduction process for the NOx catalyst 20, the air-fuel ratio of the exhaust gas passing through the NOx catalyst 20 temporarily becomes richer to a large extent ((A) in FIG. 3(I)). At this time, in the case where the control of the catalyst pass-through exhaust gas amount is not performed, the air fuel ratio of the exhaust gas returns to the previous level in a short time ((A) in FIG. 3(I)) since the catalyst pass-through exhaust gas amount does not decrease ((B) in FIG. 3(II)), while in the case the control of the catalyst pass-through exhaust gas amount is performed, the state in which the air-fuel ratio of the exhaust gas is shifted to a richer level continues for a long time ((A') in FIG. 3(I)) since the catalyst pass-through exhaust gas amount decreases ((B') in FIG. 3(II)).

As a result, in the case where the control of the catalyst pass-through exhaust gas amount is performed, NOx emitted from the NOx catalyst 20 in the reduction process for the NOx catalyst 20 is reduced and removed more reliably and the amount of NOx emitted from the NOx catalyst 20 is reduced ((C') in FIG. 3(III)), as compared to the case where the control of the catalyst pass-through exhaust gas amount is not executed ((C) in FIG. 3(III)).

As per the above, by executing the catalyst pass-through exhaust gas amount control routine by the ECU 35 upon adding fuel, reduction in the amount of NOx generated in the internal combustion engine 1 by the EGR and the reduction reaction in the NOx catalyst 20 are both achieved favorably, and the effect of reducing the NOx emission achieved by the exhaust gas purification system as a whole can further be enhanced, even in cases where the reduction process for the NOx catalyst 20 is performed while the EGR is being carried out.

The embodiment described in the forgoing is an example presented for the purpose of explanation, and various modifications can be made to the above described embodiment within a scope not departing from the essence of the present invention. For example, in cases where a PM filter 200 on which an NOx catalyst is supported is provided as an exhaust gas purification apparatus instead of the NOx catalyst 20 in the embodiment described in the forgoing (a reference sign for the PM filter 200 is indicated in parentheses in the FIG. 1), a regeneration process in which PM deposited on the PM filter 200 is oxidized and removed by fuel addition will be performed. In the regeneration process, in order to discharge the reaction heat upon oxidation reaction of the PM to prevent excessive temperature rise of the PM filter 200, the low pressure EGR gas amount and/or the high pressure EGR gas amount is controlled so as to increase the amount of the exhaust gas passing through the PM filter 200 at the time of fuel addition. Specifically, the low pressure EGR gas amount is controlled to be made larger at the time when the regeneration process is performed. In this case, in order to aid a temperature raising process for the PM filter 200 performed before carrying out the regeneration process, the high pressure EGR gas is controlled to be made larger at the time of the temperature raising process, as is the case with the above described NOx catalyst.

In the above described embodiment, a structure having an NOx catalyst as an exhaust gas purification apparatus provided in the exhaust passage upstream of the point of connection with the low pressure EGR passage has been described by way of example. This is the simplest structure presented to described the effect of the present invention. In practice, one or more other exhaust gas purification apparatuses may be provided in the exhaust passage including the portion downstream of the point of connection with the low pressure EGR passage, as a matter of course. In such cases, if there is an exhaust gas purification apparatus having a reaction activity characteristic that changes depending on the flow rate or space velocity of the exhaust gas passing through the exhaust gas purification apparatus, the characteristic effect of the present invention that the exhaust gas purification ability can be performed more effectively can be achieved as with the NOx catalyst in the above described embodiment by providing it in the exhaust passage upstream of the point of connection with the low pressure EGR passage.

INDUSTRIAL APPLICABILITY

With the exhaust gas purification system according to the present invention, even in the case where exhaust gas purification by an EGR apparatus and exhaust gas purification by an exhaust gas purification apparatus are performed in the same period in an exhaust gas purification system provided with the EGR apparatus and the exhaust gas purification apparatus, both the exhaust gas purifications are performed in a preferable manner, and the exhaust gas purification effect achieved by the exhaust gas purification system as a whole can be enhanced as much as possible.

The invention claimed is:

1. An exhaust gas purification system for an internal combustion engine, characterized by comprising:
    an exhaust gas purification apparatus that purifies exhaust gas discharged from the internal combustion engine;
    a fuel addition apparatus that supplies fuel from upstream of said exhaust gas purification apparatus;
    a turbocharger including a turbine provided in an exhaust pipe upstream of said exhaust gas purification apparatus and a compressor provided at a point in an intake pipe of said internal combustion engine;
    a high pressure EGR apparatus that recirculates a portion of exhaust gas in the exhaust pipe upstream of said turbine into the intake pipe downstream of said compressor;
    a low pressure EGR apparatus that recirculates a portion of exhaust gas in the exhaust pipe downstream of said exhaust gas purification apparatus into the intake pipe upstream of said compressor;
    a control unit for controlling the amount of the exhaust gas recirculated by said high pressure EGR apparatus and/or the amount of the exhaust gas recirculated by said low pressure EGR apparatus to control the amount of the exhaust gas passing through said exhaust gas purification apparatus when fuel is supplied to said exhaust gas purification apparatus from said fuel addition apparatus; and a filter regeneration unit for performing a filter regeneration process of oxidizing particulate matter collected on a PM filter provided in said exhaust gas purification apparatus by supplying fuel to said PM filter from said fuel addition apparatus, wherein when said filter regeneration process is performed, said control unit makes the amount of the exhaust gas recirculated by said low pressure EGR apparatus larger as compared to when said filter regeneration process is not performed.

2. An exhaust gas purification system for an internal combustion engine according to claim 1, characterized by further comprising a filter temperature raising unit for performing a filter temperature raising process of raising the temperature of said PM filter before performing said filter regeneration process, wherein when said filter temperature raising process is performed, said control unit makes the amount of the exhaust gas recirculated by said high pressure EGR apparatus larger as compared to when said filter temperature raising process is not performed.

3. An exhaust gas purification system for an internal combustion engine, characterized by comprising:
    an exhaust gas purification apparatus that purifies exhaust gas discharged from the internal combustion engine;
    a fuel addition apparatus that supplies fuel from upstream of said exhaust gas purification apparatus;
    a turbocharger including a turbine provided in an exhaust pipe upstream of said exhaust gas purification apparatus and a compressor provided at a point in an intake pipe of said internal combustion engine;
    a high pressure EGR apparatus that recirculates a portion of exhaust gas in the exhaust pipe upstream of said turbine into the intake pipe downstream of said compressor;
    a low pressure EGR apparatus that recirculates a portion of exhaust gas in the exhaust pipe downstream of said exhaust gas purification apparatus into the intake pipe upstream of said compressor;
    a control unit for controlling the amount of the exhaust gas recirculated by said high pressure EGR apparatus and/or the amount of the exhaust gas recirculated by said low pressure EGR apparatus to control the amount of the exhaust gas passing through said exhaust gas purification apparatus when fuel is supplied to said exhaust gas purification apparatus from said fuel addition apparatus; and
    a reduction unit for performing a reduction process of reducing NOx or SOx stored in a storage reduction type NOx catalyst provided in said exhaust gas purification apparatus by supplying fuel to said NOx catalyst from said fuel addition apparatus, wherein in cases where recirculation of exhaust gas is performed by said low pressure EGR apparatus at the time when said reduction process is being performed, said control unit decreases the amount of the exhaust gas recirculated by said low pressure EGR apparatus as compared to when said reduction process is not being performed.

4. An exhaust gas purification system for an internal combustion engine according to claim 3, characterized by that if the temperature of said NOx catalyst at the time when said reduction process is performed is lower than a predetermined temperature, said control unit makes the degree of said decrease small.

5. An exhaust gas purification system for an internal combustion engine according to claim 3, characterized in further comprising a catalyst temperature raising unit for performing a catalyst temperature raising process of raising the temperature of said NOx catalyst before said reduction process is performed, wherein when said catalyst temperature raising process is performed, said control unit makes the amount of the exhaust gas recirculated by said high pressure EGR apparatus larger as compared to when said catalyst temperature raising process is not performed.

6. An exhaust gas purification system for an internal combustion engine according to claim 3, characterized in that when said reduction process is not being performed, said control unit controls the amount of the exhaust gas recirculated by said high pressure EGR apparatus and/or the amount of the exhaust gas recirculated by said low pressure EGR apparatus so that the temperature of said NOx catalyst falls within a predetermined temperature range.

7. An exhaust gas purification system for an internal combustion engine according to claim 3, characterized in that said control unit controls the amount of the exhaust gas recirculated by said low pressure EGR apparatus and/or the amount of the exhaust gas recirculated by said high pressure EGR apparatus in accordance with a nature of fuel supplied from said fuel addition apparatus.

8. An exhaust gas purification system for an internal combustion engine according to claim 3, characterized in that said control unit determines the degree of said decrease in accordance with the amount of NOx that can further be stored in said NOx catalyst at the time when said reduction process is performed.

9. An exhaust gas purification system for an internal combustion engine according to claim 8, characterized in that said control unit controls the amount of the exhaust gas recirculated by said low pressure EGR apparatus and/or the amount of the exhaust gas recirculated by said high pressure EGR apparatus in accordance with a nature of fuel supplied from said fuel addition apparatus.

* * * * *